United States Patent [19]

Pearson

[11] 4,215,172
[45] Jul. 29, 1980

[54] NOVEL RESINOUS COATING COMPOSITIONS

[76] Inventor: Glenn A. Pearson, 1311 Delaware, SW., Washington, D.C. 20024

[21] Appl. No.: 943,624

[22] Filed: Sep. 19, 1978

Related U.S. Application Data

[60] Division of Ser. No. 794,548, May 6, 1977, Pat. No. 4,119,598, which is a continuation-in-part of Ser. No. 606,842, Aug. 22, 1975, abandoned.

[51] Int. Cl.$^2$ ............... B32B 23/08; B32B 21/08; B32B 27/10; B32B 15/08
[52] U.S. Cl. ............... 428/264; 428/262; 428/436; 428/460; 428/528; 428/530
[58] Field of Search ............. 260/29.4 R, 70 R, 70 M; 428/221, 264, 262, 460, 528, 530

[56] References Cited

U.S. PATENT DOCUMENTS

| | | | |
|---|---|---|---|
| 2,482,756 | 9/1949 | Ford et al. | 8/116.3 |
| 2,628,946 | 2/1953 | Juda | 260/69 N |
| 3,816,212 | 6/1974 | O'Brien | 260/29.4 R |
| 3,883,462 | 5/1975 | Pearson | 260/29.4 R |
| 3,887,511 | 6/1975 | Juneja | 260/29.4 R |

*Primary Examiner*—Theodore E. Pertilla
*Attorney, Agent, or Firm*—Lowe, King, Price & Becker

[57] ABSTRACT

A method of preparing a resinous system, and the resinous system produced by the method is described wherein about 65–80 moles of an aldehyde such as formaldehyde, about 15–25 moles of catalyzing inorganic acid, optionally, about 3–7 moles of an alkanolamine such as triethanolamine, and about 20–30 moles of urea, are reacted to provide an aqueous resinous solution. The resinous solution will cure at room temperature or upon application of heat, permitting its use as a flexible, pliable, waterproof, non-burning coating.

5 Claims, No Drawings

NOVEL RESINOUS COATING COMPOSITIONS

CROSS REFERENCE TO RELATED APPLICATION

This is a division, of application Ser. No. 794,548 filed May 6, 1977, now U.S. Pat. No. 4,119,598, which is a continuation-in-part of Ser. No. 606,842, filed Aug. 22, 1975, now abandoned.

FIELD OF THE INVENTION AND PRIOR ART

The present invention relates to resinous coating systems. More particularly, it relates to novel ureaformaldehyde resinous systems whereby aqueous formaldehyde, a catalyzing inorganic acid, urea and optionally triethanolamine, are sequentially reacted in selected proportions to yield an aqueous resinous composition providing unique properties and/or characteristics when employed as or in coatings, particularly coatings which are flexible, waterproof and fireproof.

Urea-formaldehyde resinous systems are well known in the art for use in various applications. Moreover, various modifications to such resinous systems have been described in the literature including the co-reaction of the formaldehyde and urea with triethanolamine. Further, techniques have been devised to provide formaldehyde-urea resinous systems which are water soluble. However, in the prior art systems, the control of the reaction is difficult, apparently due to the high reactivity of the formaldehyde and urea leading to varying degrees of nonuniformity of the resinous system from batch to batch. To obtain water-soluble resinous systems, relatively complex techniques of acidification and neutralization are necessary. These techniques again lead to non-uniform resinous systems which often provide cured products with deficiencies.

In my prior U.S. Pat. No. 3,883,462, there are described and claimed resinous systems similar to those claimed herein. The composition of the present invention is an improvement over my prior patent in the formation of a resinous coating solution having excellent fire retardant properties.

OBJECTS OF THE INVENTION

It is accordingly a primary object of the present invention to provide a controllable method of producing a urea-formaldehyde resin.

It is another object of this invention to provide a simplified method of producing water-soluble urea-formaldehyde resinous systems having consistent uniformity from batch to batch.

It is another object of this invention to provide an aqueous resinous system which is compatible with various additives, permitting modification of the system to meet the requirements of various diverse applications.

It is another object of this invention to provide an aqueous resinous system which is air or heat curable to a tough, clear, flexible, waterproof non-burning coating.

It is another object of this invention to provide an aqueous resinous system which is air or heat curable and which has a high degree of flame retardancy.

These and other objects of the present invention will be more readily apparent from the following detailed description.

THE INVENTION

The aforesaid objects of the present invention are accomplished by the sequential reaction of an aldehyde such as formaldehyde, urea, a catalyzing inorganic acid, and optionally an alkanolamine such as triethanolamine in selected proportions. If triethanolamine is added, it is mixed with the formaldehyde prior to addition of the urea. The proportions are 65–80, preferably 73, moles of aqueous formaldehyde, preferably 37 to 40 percent non-volatile; 15–25 moles, preferably 18, moles of catalyzing acid, preferably phosphoric acid at 85 percent non-volatile; 3–7, preferably 4, moles of triethanolamine, preferably 98% TEA, and 20–30, preferably 24, moles of urea. If the ratios deviate from the aforesaid stated amount by more than about 15 percent, the unique properties of the polymer will be affected and to this extent, the ratios are critical. Moreover, the sequential addition, and/or reaction of the reactants is critical. The formaldehyde and urea are initially mixed, together with alkanolamine if added, and the acid is added last.

While urea is the preferred reactant, it should be understood that other ureas such as thiourea, ethylene urea, dimethylol ethylene urea, dimethylol propylene urea, dimethylol dihydroxy ethylene urea, or other substituted urea may be employed. As the aldehyde, one may use a simple aldehyde such as formaldehyde, acetaldehyde, paraldehyde, glyoxal, or other mono-, di-, or poly-aldehydes. In addition, any substance yielding or acting as an aldehyde may be used. Formaldehyde is the preferred aldehyde as it is conveniently obtained commercially as a 37 weight percent aqueous solution. The preferred alkanolamine may have 1 to 4 carbon atoms in the alkyl group. The most preferred alkanolamine is triethanolamine but others such as diethanolamine, or mixtures, may also be used. Of the inorganic acids which may be used, phosphoric acid or its salts, e.g., ammonium phosphates, or substances yielding phosphoric acid, are particularly preferred. However, other acids such as HCl and $H_2SO_4$ may also be used.

On addition of the acid, the resulting reaction is exothermic leading to substantially immediate and complete exothermic reaction. The reaction proceeds smoothly and is extremely rapid to provide a viscous, syrupy, water-white, aqueous, resinous solution. The resinous solution is stable at room temperature and remains stable when stored in bulk without substantial increase in viscosity for prolonged periods, i.e., up to about six weeks or longer. However, when the solution is applied as a thin film and/or as a casting, preferably with the addition of catalyzing materials, it will air cure or cure with application of heat to a clear, flexible, insoluble plastic.

The large quantity of phosphoric acid is essential to the reaction of the present invention, and the amount of phosphoric acid used and sequence of addition of the reactants, represent improvements over my prior Patent No. 3,883,462, because of the different properties obtained. Although all strong inorganic acids such as hydrochloric acid, sulfuric acid, and phosphoric acid are operable, phosphoric acid is definitely preferred. Phosphoric acid as the catalyzing acid not only results in a very rapid, but controllable reaction, but also provides an aqueous resinous solution which has good shelf life and consistency. Further, the resultant product has good fire-retardancy and other properties.

It is also within the scope of the invention to employ other additives in the compositions to affect other properties. Thus metal and ammonium salts can be added to increase the efficiency of the fire retardant characteristics and other desirable properties such as hardness and greater resistance to solvents or weathering. Additives of this type include oxides, hydroxides, sulfates, nitrates, phosphates, and chlorides of aluminum, zinc, tin, antimony, as well as ammonium salts. The metal salts are mixed with the phosphoric acid in the formulation whereas ammonium hydroxide when used is mixed with the urea-formaldehyde solution. The metal salts are reacted in an amount of about 6 to 12 moles based on the moles of phosphoric acid used. Ammonium hydroxide is used in an amount of about 15 to 20 moles based on the moles of aldehyde used. The ammonium hydroxide is used as a buffer to raise the pH of the solution. In a still further embodiment, lactic acid or equivalent may be added to the solution in an amount of about 0.1 to 20 parts per 100 parts of total solution as this material improves stability, prevents cloudiness and cracking of the coating.

Although the aqueous resinous system of this invention can be used as such in or as coatings, moldings, adhesives, or the like, a characteristic feature of the resinous system is its compatibility with various accelerators and modifiers to permit the use of the resinous system in diverse applications. More specifically, the resinous system is compatible with other catalyzing agents, other fireproofing agents, fillers, pigments, lubricants, and the like.

The resin is formed by mixing the ingredients in the amounts and in the sequence indicated herein. Mixing is preferably carried out at room temperature but when the phosphoric acid is added an exothermic reaction occurs and the temperature rises rapidly to 165° F. to 190° F. On cooling the resulting resinous product is ready for use.

As indicated when applied as a coating, the resin dries and cures at room temperature to provide a coating that is flexible, pliable, waterproof, and will not burn. It is thus useful as a coating on substrates such as paper, cardboard, wood, metals such as aluminum, and the like. On substrates of the type mentioned, the coatings may be used to prevent the oxidation of metals, i.e., as a rust-proofing agent, as a fire- and waterproof coating on wood, cardboard and fiberglass packing and the like.

While the triethanolamine is not essential to the composition of the invention, it is advantageous as it provides for thicker coatings when desired, a coating which is easier to laminate, and the resin does not congeal or form a film in water as readily, when those properties are desired.

As pointed out, an essential and critical aspect of the invention is the amount of phosphoric acid used in forming the composition as this large amount of acid is essential in providing the novel and unexpected properties of the flexible films of the present invention. Thus, as compared to the compositions of my prior U.S. Pat. No. 3,883,462, the compositions of the invention are more waterproof, more pliable, that is, not as brittle; more fireproof since the instant compositions easily pass flamespread tests; and form a clearer, more stable solution on storage. After storage they are ready to use.

PREFERRED EMBODIMENT AND ILLUSTRATIVE EXAMPLES

Having described the invention in general terms, a preferred and illustrative embodiment of the invention, as well as examples of the utility of the invention, will be set forth.

EXAMPLE 1

Sixty grams aqueous formaldehyde (37 percent non-volatile), 7 grams 98% triethanolamine and 15 grams urea are well mixed, and there is added 20 grams of aqueous phosphoric acid (85 percent non-volatile). An exothermic and substantially immediate reaction occurred and the temperature reached was 180° F. The resulting solution was clear on cooling.

To show the utility of the resinous composition, the cool solution obtained was applied to (a) a wood panel and (b) a piece of cardboard as thin coatings with a paint brush, and the wood panel and cardboard cured at room temperature for ten minutes. The coatings on the wood panel and cardboard were uniform, without indication of blistering or the like, and were completely clear, only emphasizing the natural grain of the wood. On bending a portion of the treated cardboard, the coating was observed to be flexible and did not crack. The wood panel and cardboard were placed in a water bath maintained at room temperature for a period of eight hours with only portions submerged. Thereafter, they were withdrawn from the water bath and permitted to dry. After drying, there was no visible effect of the water upon the resin coatings. The submerged and unsubmerged portions were identical. However, where the wood had not been coated, a distinct water line was noted and the untreated portion of cardboard was wet and soggy.

The treated portions of the wood panel and cardboard were also subjected to a flame from a propane blow torch for five minutes in a single area. No burning or ignition was observed.

EXAMPLE 2

In this example, two separate solutions were prepared containing the following components:

| A. | 37% | Formaldehyde | 243 grams |
|---|---|---|---|
|    | 85% | Phosphoric Acid | 115 grams |
|    | 100% | Urea (N = 46%) | 75 grams |
| B. | 37% | Formaldehyde | 243 grams |
|    | 85% | Phosphoric Acid | 115 grams |
|    | 100% | Urea (N = 46%) | 80 grams |

In this example, the formaldehyde and urea were initially mixed and the phosphoric acid was added thereto. After addition of all the components an exothermic reaction took place rapidly and the solution reached a temperature of approximately 160° F. exothermically. The stirring action was continued until the solution cooled to approximately 130° F. where 15 to 20% of isopropyl alcohol was added to each solution to act as a stabilizer and reduce surface tension on application.

The compositions prepared above were then submitted to the Hardwood Plywood Manufacturers Association for testing to determine fire retardant properties and particularly for burn tests using the radiant heat panel test. In conducting these tests, the solution samples are applied to a substrate for testing in the fire retardant test. In the case of composition A the substrate was 18 inches long by 6 inches wide hardwood panel cut from thin veneer used on wood door facings and consisting of three plies of wood. The sample sizes are standard for this test. The sample of wood veneer was then treated with an amount of solution A using a paint bruch to apply the solution to the faces of the substrate at the rate of 20 grams per square foot leaving a slight coating on the surface. Any excess is wiped off with a paper towel and allowed to dry. In the case of composition B this solution was applied in the same manner to a piece of oak veneer, 18 inches long by 6 inches wide and 1/20 inch thick, in the same manner. The substrate for solution B was not a laminate. The treated samples were then submitted to the radiant panel test for flame spread.

In conducting these tests the flamespread factor is determined against a reference standard and the purpose of the test is to determine the relative surface flammability performance of various materials under specific test conditions using a radiant heat source. The results are reported as flame spread index.

The criteria for the tests are as follows:

I. TEST METHOD

The test was conducted in accordance with ASTM Designation E-162, "Standard Method of Test for Surface Flammability of Materials Using a Radiant Heat Energy Source."

II. PURPOSE

The purpose of the test is to determine the relative surface flammability performance of a material under specific test conditions when using a radiant heat source. The results are reported as a Flamespread Index.

The surface flammability results of the radiant panel are sometimes used by code authorities and regulatory agencies for the acceptance of interior finish, kitchen cabinet materials, and products for various applications.

The flamespread classification system used by most of the model building codes and the National Fire Protection Association Life Safety Code, NFPA No. 101, encompasses the following:

| Class A | (I)   | 0 to 25    | Flamespread |
| Class B | (II)  | 26 to 75   | Flamespread |
| Class C | (III) | 76 to 200  | Flamespread |
| Class D | (IV)  | 201 to 500 | Flamespread |
| Class E | (V)   | over 500   | Flamespread |

III. LIMITATION

The flamespread classification system outlined above was based on the premise that the higher the flamespread numbers, the greater the fire hazard. The relationship between the numbers developed under ASTM E-162 and other surface flammability tests and life safety from fire has not been adequately established. The phenomenon of a destructive fire is very complicated and probably precludes the use of a single index to describe the level of fire hazard.

While existing flamespread test methods are useful tools, caution should be exercised in the use and interpretation of the numbers resulting; linearity should not be assumed: a material with a flamespread of 150 is not necessarily twice as hazardous as a material with a flamespread of 75.

IV. TEST PROCEDURE NOTES

A radiant panel 12 inches wide by 18 inches high of porous refractory material mounted vertically is preheated with a gas-air mixture to a radiant output equal to that obtained from a black body of the same dimensions operating at a temperature of 1238±7° F. (670±4° C.). The test specimen, 6 inches wide by 18 inches high suitably mounted in a frame, is placed facing the radiant panel, but inclined at an angle of 30° from the top downward. A pilot burner adjusted to provide a 2" to 3" flame serves to ignite the sample at the top. The material under test burns downward. The operator records the flame progression time at 3, 6, 9, 12 and 15 inch interval marks measured from the top of the sample. The operator records the maximum temperature increase resulting from the burning sample as measured by 8 thermocouples connected in parallel and located in a sheet metal stack above the tested sample. The Flamespread Index is derived by the following formula:

Is=Fs Q where . . .

Is is the Flamespread Index

Fs is the Flamespread Factor

Q is the Heat Evolution Factor

The following provides a description of the two factors from which the Flamespread Index is calculated:

(A) Fs—Flamespread Factor is determined by the speed at which the flame front burns down the specimen. The higher the value, generally the faster the specimen burns.

Specifically, the Fs is the sum of . . . one, plus the reciprocals of the times in minutes that the flame front burns from each of the five three inch intervals down the specimen:

$$Fs = 1 + \frac{1}{t3} + \frac{1}{t6 - t3} + \frac{1}{t9 - t6} + \frac{1}{t12 - t9} + \frac{1}{t15 - t12}$$

where t3 equals time at 3 inches, t6 time at 6 inches, etc.

(B) Q—Heat Evolution Factor is determined by the maximum temperature developed in the stack above the burning sample as a result of the burning characteristics of the material under test. Generally, the higher the value the larger and/or hotter the flame during burning.

Specifically, Q is a product of 0.1 (an arbitrary constant) and T (the maximum stack thermocouple temperature rise (F°) over that observed with an asbestos cement board specimen) over β (a constant for each radiant panel apparatus derived from relating stack thermocouple temperature rise to heat input):

$$Q = 0.1 \, (T/\beta)$$

V. PREPARATION AND CONDITIONING OF TEST SAMPLES

The 6"×18" specimens are predried for 24 hours at 140° F. (60° C.) and then conditioned at a controlled temperature of 73±5° F. (23±3° C.), and a relative humidity of 50±5 percent.

The test method requires that at least four specimens of each sample be tested.

Occasionally, for research and development informational purposes, fewer than four determinations are conducted on a given sample.

VI. CALIBRATION AND REFERENCE STANDARD

An HPMA radiant panel is calibrated using the procedures as outlined in ASTM E-162 and in the Appendix to the standard. In addition to periodic recalibration, the HPMA, from time to time, checks procedural details and testing techniques by use of surface flammability standards obtained from the National Bureau of Standards. This Standard Sample is ¼" hardboard and has a flamespread index of 190.

As a result of the test, Compositions A and B showed the following flamespread ratings.

Composition A—Flamespread Rating 55
Composition B—Flamespread Rating 25

In the above ratings, it will be noted that Composition B was a Class A flamespread material, Composition A is a Class B flamespread material.

EXAMPLE 3

This example illustrates the use of additives in the system. The following formulation was prepared:

A. 153 g Phosphoric Acid 85%
27 g Aluminum Hydroxide
25 g Zinc Nitrate

The above three ingredients are combined and heated slightly to start the reaction which is exothermic. The reaction takes approximately 15 to 20 minutes to digest fully the aluminum hydroxide and zinc nitrate into the phosphoric acid. The resulting mixture is added to the mixture below.

B. 243 g of 37% Formaldehyde
80 g of 100% Urea (N=46%)
25 g of 28% Ammonium Hydroxide The reaction of phosphoric acid, aluminum hydroxide and zinc nitrate (Mixture A) should be cooled down some before adding to mixture B of formaldehyde-urea-ammonium hydroxide. After adding the two mixtures together the solution is stirred until the reaction is complete and cooled down, a lower alkyl alcohol (isopropanol) can be added at this point in the amount of 20 to 25% to stop the solution from going to gel state and into a solid. Other buffers in place of ammonium hydroxide can be added to bring the pH up slightly such as sodium borate, sodium hydroxide or triethanolamine. Buffering the solution allows greater water dilution and clean up of utensils and tools using the water solution.

SAMPLES

A number of oak wood veneers (24"×12"×1/16" thick) were treated by painting with a brush at the rate of 30 grams per sq. ft. on both sides. The solution penetrated into the wood, leaving a slight coat on the surface. These were left to air dry for about 6 hours and then placed in an oven for 10 minutes at 250° F. Samples were then placed in water and held for 72 hours to test for leaching of the fire retardant and effect on the finish. On removing the finish, the results were clear; there were no water marks or whitening effects. These samples were then submitted to a radiant panel test for flamespread. The results were a Class A rating.

EXAMPLE 4

The following formulation was prepared by the mixing procedure of Example 1:

30 parts 98% Triethanolamine
243 parts 37% Formaldehyde
115 parts 85% Phosphoric Acid
75 parts 100% Urea
10 parts Lactic Acid (85%)

The resulting solution provides a Class A rating when applied at a rate of 15 grams per square foot to substrates. This solution with the lactic acid can withstand higher curing temperatures, e.g. up to 360° F., for longer periods without browning or yellowing. It thus is preferred to treat textiles with this solution. The pH of 1.2 does not adversely affect cotton.

The invention has been described herein with reference to certain preferred embodiments. However, as obvious variations thereon will become apparent to those skilled in the art, the invention is not considered to be limited thereto.

What is claimed is:

1. As an article of manufacture, a substrate selected from the group consisting of wood, paper, metal and textiles, coated with a resinous solution comprising the reaction product of (a) about 65–80 moles of formaldehyde, (b) about 20–30 moles of urea, and (c) about 15–25 moles of phosphoric acid, said solution being formed by initial mixing of said formaldehyde and said urea followed by the addition of said phosphoric acid, whereby upon addition of said phosphoric acid, an exothermic reaction occurs leading to a substantially immediate and complete exothermic reaction to form a viscous, syrupy, water-white, aqueous resinous solution, the solution being a stable solution having a good shelf life and forming flexible, waterproof and non-burning films.

2. An article according to claim 1 wherein the substrate is wood.

3. An article according to claim 1 wherein the substrate is paper.

4. An article according to claim 1 wherein the substrate is metal.

5. An article according to claim 1 wherein the substrate is textiles.

* * * * *